United States Patent [19]

Kapoor et al.

[11] Patent Number: 5,538,706
[45] Date of Patent: Jul. 23, 1996

[54] HYDROGEN AND CARBON MONOXIDE PRODUCTION BY PARTIAL OXIDATION OF HYDROCARBON FEED

[75] Inventors: Akhilesh Kapoor, South Orange, N.J.; Ramachandran Krishnamurthy, Chestnut Ridge, N.Y.; Donald L. MacLean, Clinton, N.J.

[73] Assignee: The BOC Group, Inc., New Providence, N.J.

[21] Appl. No.: 236,282

[22] Filed: May 2, 1994

Related U.S. Application Data

[63] Continuation-in-part of Ser. No. 932,861, Aug. 19, 1992, abandoned.

[51] Int. Cl.$^6$ ............................ C01B 3/02; C01B 3/24; C01B 3/26
[52] U.S. Cl. .................. 423/418.2; 252/373; 423/648.1; 423/650; 423/651; 423/652
[58] Field of Search ........................ 423/418.2, 648.1, 423/650, 651, 652; 252/373

[56] References Cited

U.S. PATENT DOCUMENTS

| | | | |
|---|---|---|---|
| 2,671,014 | 3/1954 | Watson | 423/418.2 |
| 2,681,272 | 6/1954 | Jewell | 423/418.2 |
| 2,700,598 | 1/1955 | Odell | 423/418.2 |
| 5,073,356 | 12/1991 | Guro et al. | 423/418.2 |
| 5,160,456 | 11/1992 | Lahn et al. | 252/373 |

*Primary Examiner*—Wayne Langel
*Attorney, Agent, or Firm*—Coleman R. Reap; Larry R. Cassett

[57] ABSTRACT

Synthesis gas comprising hydrogen, water, carbon monoxide, carbon dioxide, and hydrocarbons is produced by contacting a gasified hydrocarbon feedstock and an oxidant in a partial oxidation reactor under at least 95% carbon monoxide selective, low hydrocarbon conversion conditions wherein the temperature, pressure, and flow rate conditions in the reactor yield synthesis gas having less than about 2% carbon dioxide. After being cooled, the synthesis gas is separated into high purity hydrogen, high purity carbon monoxide and a hydrogen-carbon monoxide gas mixture by pressure swing adsorption followed by cryogenic distillation or by two or more pressure swing adsorption steps.

22 Claims, 3 Drawing Sheets

5,538,706

HYDROGEN AND CARBON MONOXIDE PRODUCTION BY PARTIAL OXIDATION OF HYDROCARBON FEED

RELATED CASE

This application is a continuation-in-part of application Ser. No. 07/932,861, filed Aug. 19, 1992, now abandoned.

BACKGROUND OF THE INVENTION

The present invention is directed to a method for producing carbon monoxide or a mixture of carbon monoxide and hydrogen by high carbon monoxide selective, low hydrocarbon conversion partial oxidation of a hydrocarbon feed mixture to synthesis gas. The invention is also directed to improved methods for separating hydrogen and carbon monoxide from a synthesis gas comprising hydrogen, water, carbon monoxide, carbon dioxide, and hydrocarbons.

DESCRIPTION OF THE BACKGROUND

Synthesis gas, a mixture of hydrogen and carbon monoxide, is used as a reagent for the synthesis of chemicals, as a reducing gas for metallurgical applications, as fuel for industrial boilers and process heaters, and for the production of electricity. Synthesis gas is conventionally generated by the partial oxidation of gaseous or liquid hydrocarbon feed mixtures with an oxidant such as oxygen or air in the presence of a moderating agent, such as steam or carbon dioxide, at high temperature and usually at high pressure.

To satisfy product purity requirements the reaction conditions maintained during a conventional partial oxidation reaction are generally such that the synthesis gas product will contain only small amounts of unreacted hydrocarbons. To achieve this result the partial oxidation reaction is carried out at a high oxygen to hydrocarbon ratio, a high steam to hydrocarbon ratio, and a high reactor temperature. Under such conditions, significant amounts of carbon dioxide are usually produced. This procedure is inefficient not only because the carbon dioxide is formed at the expense of the desired carbon monoxide, but also because excess oxidant and moderating agent are required to oxidize the trace amounts of hydrocarbons remaining in the product stream so that the product will meet the established purity requirements.

Following the partial oxidation reaction carbon monoxide and hydrogen are recovered from the raw synthesis gas by selected separation techniques. The raw synthesis gas components generally include hydrogen, water, carbon monoxide, carbon dioxide and unreacted or by-product hydrocarbons. Various methods are known in the art for separating these components. According to a preferred method, carbon dioxide is removed from the synthesis gas in an absorption step; water vapor, residual carbon dioxide and higher hydrocarbons are removed in an adsorption prepurification unit; and a carbon monoxide product stream containing lower hydrocarbons (predominantly methane) and a hydrogen-enriched fraction are recovered in a cryogenic fractional distillation step. The hydrogen-enriched fraction is then passed through a pressure swing adsorption (PSA) system to produce high purity hydrogen and a hydrogen and carbon monoxide fraction.

While the above procedures are preferred for producing raw synthesis gas and separating the components of the gas, the efficiency of these procedures leaves something to be desired. More efficient methods for producing raw synthesis gas and for recovering high purity hydrogen and carbon monoxide from the raw synthesis gas are continually sought. The present invention provides an improved method for producing synthesis gas by partial oxidation of hydrocarbons using reduced amounts of starting materials per unit production of hydrogen and carbon monoxide, and a novel method of recovering high purity hydrogen and carbon monoxide from gas mixtures.

SUMMARY OF THE INVENTION

According to one aspect of the invention, synthesis gas having less than about two percent (by volume) carbon dioxide is produced by reacting a feedstock comprising one or more hydrocarbons, an oxidant, and either or both of carbon dioxide and steam as a temperature moderator, at a temperature in the range of about 800° to about 1200° C., a pressure in the range of about 15 to about 1000 psig, a steam to carbon ratio and a carbon dioxide to carbon ratio each in the range of 0 to about 0.5, provided that at least one of these ratios is not 0 (i.e. at least one of these components must be present in the reaction zone), an oxygen to carbon ratio in the range of about 0.3 to about 0.6 and a maximum total sensible heat requirement (mount of heat required to raise all of the reactants to the desired reaction temperature) of about 0.05 million kilojoules per thousand atoms of carbon in the hydrocarbon feed (MMKJ/KC).

According to another aspect of the invention, high purity hydrogen and high purity carbon monoxide are recovered from a gas mixture comprised of hydrogen, carbon monoxide, water vapor, carbon dioxide and hydrocarbons, such as a synthesis gas, by passing the gas mixture through an initial PSA system at a superatmospheric pressure, the PSA system comprising at least one adsorption zone comprising an adsorbent which adsorbs carbon monoxide less strongly than higher hydrocarbons, water vapor, and carbon dioxide but more strongly than hydrogen, thereby adsorbing higher hydrocarbons, water vapor, carbon dioxide and carbon monoxide and producing high purity hydrogen; terminating the flow of the gas mixture into the adsorption zone when the carbon monoxide front in the adsorption zone reaches a predetermined point, and withdrawing a carbon monoxide-rich stream from the adsorption zone by partially depressurizing the adsorption zone; desorbing hydrocarbons, water vapor and carbon dioxide from the adsorption zone by further depressurizing the adsorption zone; and fractionally distilling the carbon monoxide-rich fraction, thereby recovering high purity carbon monoxide.

Lower hydrocarbons, such as methane, present in the carbon monoxide-rich fraction can be removed therefrom by conducting the distillation in two stages, wherein hydrogen is separated from the carbon monoxide and methane in a first fractionation and carbon monoxide is separated from methane in a second fractionation.

In a variation of the product separation aspect of the invention, the separation of methane and hydrogen from the carbon monoxide-rich fraction exiting the PSA system is performed in a second PSA system which contains an adsorbent which more strongly adsorbs carbon monoxide than methane, hydrogen and carbon dioxide.

In a preferred embodiment of the product separation aspect of the invention, water vapor, carbon dioxide and any higher hydrocarbons present in the carbon monoxide-rich fraction exiting the initial PSA system are separated therefrom prior to the high purity carbon monoxide recovery step by passing this fraction through a prepurification unit which preferentially adsorbs water vapor, carbon dioxide and higher hydrocarbons.

In another preferred embodiment of the product separation aspect of the invention, the PSA system comprises serially connected adsorption zones each of which contains an adsorbent which adsorbs carbon monoxide less strongly than higher hydrocarbons, water vapor and carbon dioxide but more strongly than hydrogen. In such a system, high purity hydrogen is withdrawn from the downstream end of the second adsorption zone, the carbon monoxide-rich fraction is withdrawn from the initial PSA system at a point between the adsorption zones in a first depressurization step, and the higher hydrocarbons, water vapor and carbon dioxide are withdrawn from the initial PSA system at a point upstream of the first adsorption zone in a second depressurization step. In this embodiment the carbon monoxide-rich fraction can be simultaneously withdrawn from both serially-connected adsorption zones or it can be first withdrawn from one adsorption zone, preferably the second adsorption zone, i.e. the downstream adsorption zone, and subsequently withdrawn from the other adsorption zone, i.e. the first adsorption zone.

If desired, different adsorbents can be used in the first and second adsorption zones of the embodiment employing serially-connected adsorption zones. For example, activated carbon can be used in the first adsorption zone and a mixture of activated carbon and zeolite molecular sieves can be used in the second adsorption zone.

In a third aspect of the invention high purity hydrogen and carbon monoxide are produced by a combined process comprising:

(a) producing a synthesis gas by contacting in a reaction zone a feedstock comprising one or more hydrocarbons with an oxidant and one or both of carbon dioxide and steam as a reaction moderator in a partial oxidation reactor at a temperature in the range of about 800° to about 1200° C. and a pressure in the range of about 15 to about 1000 psig, and with a steam to carbon ratio and a carbon dioxide to carbon ratio each in the range of 0 to about 0.5, provided that at least one of these ratios is not 0, an oxygen to carbon ratio in the range of about 0.3 to about 0.6, and a maximum total sensible heat requirement of about 0.05 MMKJ/KC, thereby producing a gas mixture comprised of hydrogen, carbon monoxide, unreacted hydrocarbons, water vapor and carbon dioxide; and (b) recovering high purity hydrogen and carbon monoxide from the gas mixture by (1) flowing the gas mixture through a PSA system comprising first and second serially-connected adsorption zones each containing an adsorbent which adsorbs carbon monoxide less strongly than higher hydrocarbons, carbon dioxide and water vapor but more strongly than hydrogen, thereby adsorbing higher hydrocarbons, water vapor, carbon dioxide and carbon monoxide, and producing high purity hydrogen; (2) terminating the flow of gas mixture through the PSA system when the carbon monoxide front in the second adsorption zone reaches a predetermined point, and partially depressurizing the first and second adsorption zones by withdrawing a carbon monoxide-rich fraction countercurrently from the second adsorption zone and cocurrently from the first adsorption zone; (3) further depressurizing the first and second adsorption zones by countercurrently withdrawing a stream rich in hydrocarbons, water vapor and carbon dioxide therefrom; (4) fractionally distilling the carbon monoxide-rich fraction, thereby forming high purity carbon monoxide, a hydrogen and carbon monoxide fraction and a methane fraction, and (5) recycling to the reaction zone the stream rich in higher hydrocarbons, water vapor and carbon dioxide and the methane fraction.

In a variation of the third aspect of the invention high purity hydrogen and carbon monoxide are produced by a combined process comprising:

(a) producing a synthesis gas by contacting in a reaction zone a feedstock comprising one or more hydrocarbons with an oxidant and one or both of carbon dioxide and steam as a reaction moderator in a partial oxidation reactor at a temperature in the range of about 800° to about 1200° C. and a pressure in the range of about 15 to about 1000 psig, and with a steam to carbon ratio and a carbon dioxide to carbon ratio each in the range of 0 to about 0.5, provided that at least one of these ratios is not 0, an oxygen to carbon ratio in the range of about 0.3 to about 0.6, and a maximum total sensible heat requirement of about 0.05 MMKJ/KC, thereby producing a gas mixture comprised of hydrogen, carbon monoxide, unreacted hydrocarbons, water vapor and carbon dioxide; and (b) recovering high purity hydrogen and carbon monoxide from the gas mixture by (1) flowing the gas mixture through a first PSA system comprising at least one adsorption zone containing an adsorbent which adsorbs hydrogen less strongly than higher hydrocarbons, water vapor, carbon dioxide, methane and carbon monoxide, thereby producing high purity hydrogen; (2) terminating the flow of gas mixture through the first PSA system when the carbon monoxide front in the adsorption zone reaches a predetermined point, and withdrawing a carbon monoxide-rich fraction from the adsorption zone by partially depressurizing the adsorption zone; (3) producing a methane-rich fraction by flowing the carbon monoxide-rich fraction through a second PSA system containing an adsorbent which adsorbs carbon monoxide more strongly than hydrogen, methane and carbon dioxide, thereby producing a carbon monoxide-lean fraction; (4) terminating the flow of carbon monoxide-rich fraction through the second PSA system at a predetermined point and withdrawing high purity carbon monoxide from the adsorption zone by depressurizing the adsorption zone; and (5) recycling the carbon monoxide-lean fraction from the second PSA system to the reaction zone.

BRIEF DESCRIPTION OF THE FIGURES

The invention is illustrated in the drawings, in which.

In the drawings like characters designate like or corresponding parts throughout the several figures. Auxiliary valves, lines and equipment not necessary for an understanding of the invention have been omitted from the drawings.

DETAILED DESCRIPTION OF THE INVENTION

Figure 1:
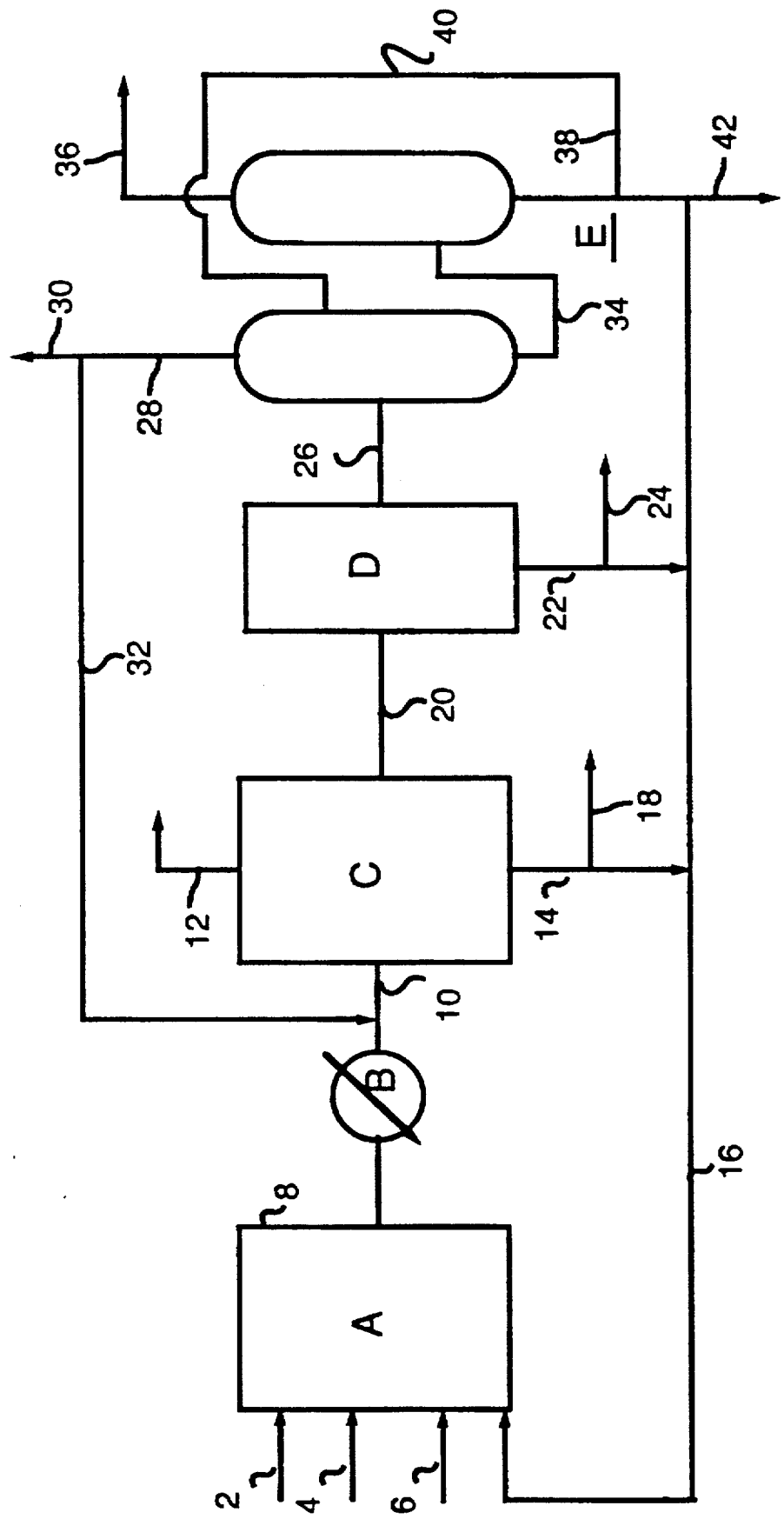
FIG. 1 is a schematic representation of a system for separating the components of a synthesis gas generated by high carbon monoxide selective, low hydrocarbon conversion in a partial oxidation reactor.

The terms "high purity hydrogen" and "high purity carbon monoxide" are used herein to describe gaseous products containing at least 98% hydrogen and 98% carbon monoxide, respectively.

Operating a synthesis gas partial oxidation reactor at high carbon monoxide selectivity and low hydrocarbon conversion to carbon oxides conditions minimizes the amount of carbon dioxide produced in the synthesis gas and reduces the consumption of oxidant, moderating agent, and hydrocarbon feedstock per unit production of hydrogen and carbon monoxide, compared to conventional methods. The carbon monoxide selectivity can be increased by reducing the oxygen consumed in the exothermic reactions, i.e. the oxidation of hydrocarbons to carbon monoxide and carbon dioxide. The amount of oxygen consumed can, in turn, be reduced by reducing the total heat needed in the reaction system.

The heat generated in the exothermic reactions is the sum of the sensible heat required to raise the temperature of the reactants to the reaction temperature, the heat required to drive the endothermic reactions occurring in the reactor, i.e. the conversion of methane and steam to carbon monoxide and hydrogen and the conversion of methane and carbon dioxide to carbon monoxide and hydrogen, and the heat lost from the reactor to the reactor surroundings.

The first aspect of the present invention is based on the discovery that the carbon dioxide concentration in a synthesis gas produced by a partial oxidation reaction can be lowered and the carbon monoxide selectivity of the process can be increased by reducing the heat requirements. According to the invention, the heat loss and sensible heat requirement are reduced by carrying out the partial oxidation reaction at a lower temperature. Since the heat loss is directly proportional to the reaction temperature, lowering the reaction temperature reduces the reaction heat loss. Conducting the reaction at a lower temperature also results in a reduced amount of sensible heat required to raise the reactants to the desired reaction temperature inside the reactor. The sensible heat requirement can also be reduced by pre-heating the reactants prior to their introduction into the partial oxidation reactor. Although it is not certain, it appears that when conditions are selected to reduce heat losses and the sensible heat contribution, the heat required for endothermic reactions also decreases.

The partial oxidation reaction may be carried out in the presence or absence of a catalyst. The reaction conditions selected for practicing the invention will generally be such as to provide a carbon monoxide selectivity (defined as total moles of carbon monoxide per total moles of carbon monoxide and carbon dioxide) higher than about 95%, and preferably higher than about 97.5%, and produce a synthesis gas containing less than about 2% carbon dioxide and usually greater than about 0.5% methane, and preferably less than about 1% carbon dioxide and greater than about 1% methane. The temperature at which the reaction is carried out will generally be in the range of about 800° C. to about 1200° C., and preferably in the range of about 900° C. to about 1100° C. Carbon monoxide selectivity is relatively less sensitive to pressure than temperature and hence the partial oxidation reactor can operate over a wide range of pressures. The reaction pressure will generally be in the range of about 15 psia to about 1500 psia, and more usually in the range of about 100 psia to about 800 psia.

As noted above, the amount of sensible heat required in the process of the invention should be minimized to maximize carbon monoxide selectivity. The desired effect is realized when the total internal sensible heat requirement, i.e. the sensible heat requirement inside the reactor, is limited to about 0.05 MMKJ/KC. In preferred embodiments, the sensible heat requirement is no more than about 0.04 MMKJ/KC.

The sensible heat requirement can be further reduced by pre-heating the various feed streams to a temperature as close to the reaction temperature as possible. The optimum temperature and pressure of the oxidant, moderating agent(s) and hydrocarbon feed entering the partial oxidation reactor depends on a number of factors, such as the particular hydrocarbon(s) used as feed, the selected partial oxidation reaction temperature and the ratios of the various reactants. In general, the temperature of the oxidant and the moderator entering the partial oxidation reactor will be in the range of about 400° C. to about 1000° C., and in preferred embodiments it will fall in the range of about 600° C. to about 1000° C., and in the most preferred embodiments it will be in the range of about 900° C. to about 1000° C. The temperature of the hydrocarbon feedstock entering the partial oxidation reactor can also be in these ranges, but it is preferably at a temperature lower than the temperature at which the hydrocarbon undergoes thermal cracking. The pressure at which the reactants are introduced into the partial oxidation reactor depends, of course upon the pressure maintained in the partial oxidation reactor.

The hydrocarbon used in the synthesis reaction of the invention may be any gaseous or liquid hydrocarbon or mixture of hydrocarbons that are traditionally used for such reactions. Non-limiting examples of suitable hydrocarbon feedstocks include natural gas (methane), n-pentane, light naphtha, heavy fuel oil, vacuum residue, asphalt, and mixtures thereof. If the hydrocarbon feedstock contains sulfur, a sulfur removal step is included downstream of the process cooling and water scrubbing steps. When higher hydrocarbons are used these are generally substantially completely converted to carbon oxides or methane in the partial oxidation reaction. The term "higher hydrocarbons", as used herein, means hydrocarbons having two or more carbon atoms.

The oxidant may be oxygen or an oxygen-containing gas, such as air or oxygen-enriched air. In the preferred embodiment substantially pure oxygen is used as the oxidant, since the use of pure oxygen permits the reaction to be carried out without introducing impurities such as nitrogen or argon into the system. The introduction of such impurities is undesirable because they have to be removed during the product purification steps.

The oxygen to carbon ratio in the synthesis gas reaction of the invention is generally maintained in the range of about 0.3 to 0.6, and preferably maintained in the range of about 0.3 to 0.5. By "oxygen to carbon ratio" is meant the number of moles of oxygen introduced into the reaction zone per atom of carbon in the hydrocarbon introduced thereinto. For instance if the hydrocarbon feed is ethane, an oxygen to carbon ratio of 1 would mean that two moles of oxygen are introduced into the reactor for each mole of ethane. In considering the total hydrocarbon carbon content the hydrocarbons recycled from the recovery system are taken into account.

The moderating agent is generally steam or carbon dioxide or a mixture of these. Although both steam and carbon dioxide may be introduced into the reactor, at least one of these moderators must be present, so that control of the synthesis reaction can be properly maintained. The steam to carbon and the carbon dioxide to carbon ratios can vary from 0 to about 0.5. In preferred embodiments of the invention the steam to carbon and carbon dioxide to carbon ratios are in the range of about 0 to 0.4. The steam to carbon and carbon dioxide to carbon ratios are defined in the same manner that the oxygen to carbon ratio is defined, i.e. the number of moles of steam or carbon dioxide per atom of carbon in the total hydrocarbons introduced into the reactor.

The synthesis gas leaving the partial oxidation reactor generally contains, on a molar basis: about 30–50% hydrogen; about 25–45% carbon monoxide; about 2–20% methane; about 0.5–2% carbon dioxide and less than about 0.5% higher hydrocarbons. This compares with prior art synthesis gas compositions containing: about 35–60% hydrogen; about 25–45% carbon monoxide; less than about 0.6% methane; about 3–7% carbon dioxide and a negligible amount of higher hydrocarbons.

With respect to the partial oxidation reaction aspect of the invention, the components of the synthesis gas can be separated by any of the known methods. However, the greatest benefit of the invention is realized when the valuable components of the gas are recovered by the separation aspect of the invention. The overall process of the invention, including the partial oxidation process, and the gas separation process as applied to the recovery of high purity hydrogen and carbon monoxide from synthesis gas produced by the partial oxidation process of the invention, is illustrated in the drawings. The invention will now be described with reference to the accompanying drawings.

In the system illustrated in FIG. 1, a hydrocarbon feedstock, an oxidant such as oxygen, and one or more moderating agents, such as steam and/or carbon dioxide enter partial oxidation unit A through feed conduits 2, 4 and 6, respectively. These components react in unit A under appropriate conditions to produce a synthesis gas having a composition in the above-stated range. The synthesis gas, now at a temperature near the partial oxidation reaction temperature, leaves reactor A via line 8 and enters process cooler B wherein the gas is cooled. Some of the water vapor in the gas may condense in cooler B and if so, it is removed from the gas. If desired, the cooled gas can then be passed through a gas purifier, such as a water scrubber (not shown), to remove soot and water-soluble contaminants.

The cooled synthesis gas from process cooler B passes through line 10 to PSA unit C, wherein high purity non-adsorbed hydrogen is separated from the gas and discharged from the system through line 12.

In one embodiment of the separation aspect of the invention, the synthesis gas is further separated into a carbon monoxide-enriched intermediate fraction and an adsorbed water vapor, carbon dioxide and hydrocarbon fraction, and the latter fraction is desorbed from the adsorbent in unit C and can be recycled to partial oxidation reactor A via lines 14 and 16 or removed from the system through line 18 for further treatment or disposal. In this embodiment the carbon monoxide-enriched fraction leaves unit C through line 20 and enters adsorption prepurification unit (PPU) D (optional), wherein residual carbon dioxide, moisture and any higher hydrocarbons present in the stream are removed. These impurities, which exit unit D through line 22 may be recycled to reactor A via line 16 or they may be removed from the system through line 24 and otherwise disposed of, as by combustion.

In an alternate embodiment, the synthesis gas is separated in unit C into a non-adsorbed high purity hydrogen stream and an adsorbed higher hydrocarbon, water vapor, carbon dioxide and carbon monoxide fraction, and after desorption the latter fraction is discharged through line 20 to adsorption PPU D, wherein the higher hydrocarbons, water vapor and carbon dioxide are removed. These impurities exit unit D through line 22, and are disposed of as described above.

The pre-purified stream, now enriched in hydrogen and carbon monoxide, leaves PPU D through line 26 and enters cryogenic fractional distillation unit E wherein high purity carbon monoxide, a hydrogen and carbon monoxide fraction and a methane fraction are separated. Unit E may comprise a single cryogenic distillation column or a series of columns. In the system illustrated in FIG. 1, unit E is a two-column unit. The hydrogen and carbon monoxide fraction leaves unit E via line 28, and it can be removed from the system via line 30 and used as a synthesis gas for other processes or recycled to PSA unit C through line 32 for the recovery of additional quantifies of high purity hydrogen and/or high purity carbon monoxide. A carbon monoxide-rich stream passes out of bottom of the first column of unit E through line 34 and enters the second column of this unit. High purity carbon monoxide exits the top of the second column of unit E through conduit 36 and a methane fraction exits the bottom of the second column through line 38. In the embodiment illustrated in FIG. 1, a portion of the methane fraction leaving unit E is recycled through line 40 to the top of the first column of unit E to serve as reflux. The remainder of the methane fraction can be recycled to partial oxidation reactor A via line 16 or removed from the system via line 42 for other use or disposal.

Considering the embodiment of FIG. 1 in more detail, PSA system C can be a single adsorption zone system or a multiple zone system. In the latter case it may comprise a battery of adsorption zones arranged in series or in parallel or in combinations of these. In combination parallel and serially-connected arrangements, the serially arranged zones may be in pairs or the first row of adsorption zones may comprise more or fewer zones than the second row of adsorption zones. Parallel arrangements provide the advantage that one or more adsorption zones or sets of adsorption zones can be in the adsorption mode while one or more other zones or sets of zones are in the regeneration mode, thereby approximating a continuous adsorption process.

In the simplest form of the embodiment of FIG. 1, system C comprises a single bed adsorption unit or a battery of parallel-arranged single bed adsorption units and hydrogen is separated as the non-adsorbed stream. In one aspect of this embodiment, a carbon monoxide-rich stream is removed in a first depressurization of the bed in the co-current direction, and higher hydrocarbons, water vapor and carbon dioxide are adsorbed onto the adsorbent and subsequently desorbed in a countercurrent second depressurization step. This aspect is preferred when the total volume of higher hydrocarbons, water vapor and carbon dioxide is considerable, for instance when these components constitute more than about 1% by volume of the gas entering System C. In an alternate aspect of this embodiment, carbon monoxide, higher hydrocarbons, water vapor and carbon dioxide are all adsorbed and subsequently desorbed in a countercurrent desorption. This aspect is generally feasible when the total volume of higher hydrocarbons, water vapor and carbon dioxide is less than about 1% of the total volume of gas entering system C. In the first aspect only the carbon monoxide-rich stream is passed to PPU unit D, and in the second aspect the entire desorbed stream is passed to unit D.

Figure 2:
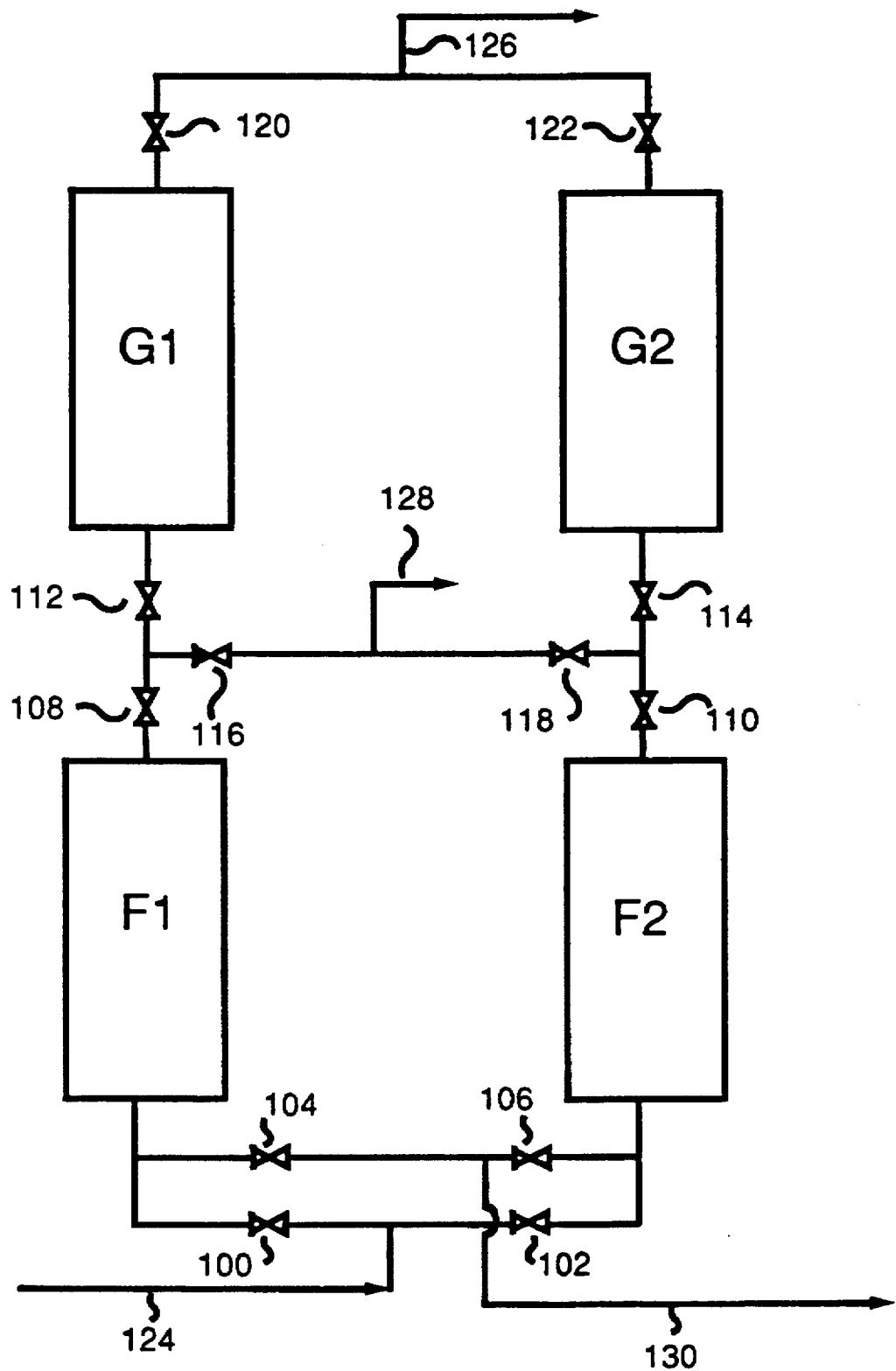
FIG. 2 is a schematic representation of a preferred PSA system for use in the separation of a synthesis gas into high purity hydrogen and a carbon monoxide-enriched fraction. This two-stage PSA system may be employed to separate any gas mixture comprising hydrogen, water, carbon monoxide, carbon dioxide, and methane.

In a preferred aspect of the embodiment of FIG. 1, system C comprises serially-connected adsorption zones, either as a series of adsorption layers in a single adsorber, as illustrated in FIG. 4 of U.S. Pat. No. 5,112,590, incorporated herein by reference, or as individual adsorption beds in separate serially-connected adsorbers, as illustrated in FIGS. 2 and 5 of U.S. Pat. No. 5,112,590, and in FIG. 5 of U.S. Pat. No. 5,096,470, also incorporated herein by reference.

In this preferred aspect, the adsorbers can be operated as individual units or together as integrated units. When operated as individual units, the first adsorber separates the cooled synthesis gas into a non-adsorbed crude hydrogen and carbon monoxide fraction and an adsorbed higher hydrocarbons, water vapor and carbon dioxide fraction. The non-adsorbed crude hydrogen and carbon monoxide fraction from the first adsorber is then introduced into the second adsorber, wherein it is separated into a non-adsorbed high purity hydrogen fraction and an adsorbed carbon monoxide-enriched fraction. The adsorbed carbon monoxide-enriched fraction is desorbed from the second adsorber and passed through prepurification unit D to remove residual carbon dioxide and water.

The fraction adsorbed in the first adsorber is desorbed and removed therefrom through line 14 and it can be recycled to unit A or further processed. Such further processing may comprise sending this stream to a PPU, such as unit D, to remove higher hydrocarbons, water vapor and carbon dioxide, as explained in the simple adsorption embodiment described above, and then sending the remaining stream to a distillation unit, such as unit E. This procedure is usually desirable when this aspect is practiced because the adsorbed component in the first adsorber unit generally contains a considerable quantity of carbon monoxide.

In the most preferred aspect of this embodiment of the invention, PSA system C comprises one or more pairs of serially-connected zones that are operated as a single unit. The serially-connected adsorption zones can be housed in single adsorbers, as shown in FIG. 4 of U.S. Pat. No. 5,112,590, or each zone may be housed in separate adsorbers. In this aspect the carbon monoxide adsorption front moves through the zones ahead of the carbon dioxide, water vapor and higher hydrocarbon fronts. When the carbon monoxide from reaches a certain point in the second zone, the adsorption step is terminated and depressurization of the adsorption zones begins. Depressurization proceeds in two steps: a first depressurization during which a carbon monoxide-rich fraction is removed from the adsorption zones and a second depressurization during which higher hydrocarbons, water vapor and carbon dioxide are removed from the zones. The first depressurization stream is withdrawn at a point between the two zones, so that the second zone is desorbed countercurrently and the first adsorber is desorbed cocurrently. The first depressurization may be carried out by simultaneously depressurizing the first and second adsorption zones or, in the case in which the adsorption zones are housed in separate adsorbers, by depressurizing first one zone and then the other. In the latter case, valves are provided in the line joining the first and second adsorbers, one on each side of the line through which the first depressurization stream is withdrawn from the adsorbers, so that one adsorber can be sealed off while the other is being depressurized. The system in which this aspect is carried out is illustrated in FIG. 2, which is described in detail below.

If desired, the first depressurization step in any of the above-described aspects may be carried out in two stages: a first stage in which a high pressure carbon monoxide-rich fraction is removed from the adsorption zone(s) and a second stage in which a low pressure carbon monoxide-rich fraction is removed from the adsorption zone(s). This presents the advantage that the high pressure fraction can be introduced directly into unit D without further pressurization.

According to a typical PSA cycle in system C, the adsorption zone(s) in system C are pressurized to the desired adsorption pressure with, for example, feed gas to system C, non-adsorbed product gas or combinations of these; feed gas is introduced into the adsorption zones and the adsorption step begins. At the completion of the adsorption step, flow of feed gas is terminated and regeneration of the adsorption zone(s) is begun. At this point the first depressurization step is started and carbon monoxide-rich fraction is withdrawn from the adsorption zones. The first depressurization is continued until the concentration of impurities (carbon dioxide, water vapor and perhaps higher hydrocarbons) in the carbon monoxide-rich fraction reaches a predetermined level. At this point the first depressurization is terminated and the second depressurization begins. The second desorption step is continued until the pressure in the adsorption zone(s) is reduced to the desired value. At this point the regeneration step is complete. Next, the adsorption zones are repressurized and the adsorption cycle is repeated.

FIG. 2 shows a preferred arrangement of PSA system C. The system of FIG. 2 comprises first adsorbers F1 and F2 and second adsorbers G1 and G2. Adsorber G1 is serially connected to adsorber F1, and adsorber G2 is serially connected to adsorber F2. All four adsorbers contain an adsorbent which adsorbs higher hydrocarbons, water vapor and carbon dioxide more strongly than carbon monoxide and hydrogen, and carbon monoxide more strongly than hydrogen. The system of FIG. 2 is designed to operate with adsorbers F1 and G1 in the adsorption mode while adsorbers F2 and G2 are in the regeneration mode, and vice versa.

Operation of the system of FIG. 2 will be described with adsorbers F1 and G1 in the adsorption mode and adsorbers F2 and G2 in the regeneration mode. In the first part of this phase valves 100, 108, 112, and 120 are open and all other valves on the left side of the system are closed. A feed gas containing higher hydrocarbons, water vapor, carbon dioxide, carbon monoxide and hydrogen enters the system through line 124 and flows through valve 100 and into adsorber F1. As the feed gas passes through adsorber F1 several wave fronts form in this adsorber. The most advanced wave front comprises carbon monoxide and it is followed by the carbon dioxide, water vapor and higher hydrocarbons wave fronts. Hydrogen passes through the adsorber and exits adsorber G1 through valve 120 and line 126. As the adsorption step proceeds each of the wave fronts moves upwardly in units F1 and G1.

Meanwhile, adsorbers F2 and G2 are being regenerated. Regeneration of these adsorbers proceeds in two stages. In the first stage, valves 110, 114 and 118 are opened and all other valves on the right side of the system are closed. A first depressurization stream rich in carbon monoxide flows downwardly through adsorber G2 and upwardly through adsorber F2 and out of the system through line 128. When the level of carbon dioxide in the first depressurization stream reaches a predetermined value, valve 118 is closed and valve 106 is opened and adsorbers F2 and G2 are both depressurized by the downward flow of gases through these adsorbers. The desorbed stream leaving the system through valve 106 and line 130 is rich in higher hydrocarbons, water vapor and carbon dioxide. When the pressure in adsorbers F2 and G2 reaches a predetermined level valve 106 is closed and units F2 and G2 are ready for the next adsorption phase of the process in these units.

Returning to the adsorption step taking place in adsorbers F1 and G1, when the carbon monoxide front in adsorber G1 reaches a predetermined point, the flow of feed gas is diverted from adsorbers F1 and G1 to adsorbers F2 and G2 and the second phase of the cycle is begun by closing valves 100 and 120 and opening valves 102, 110, 114, 118 and 122. This phase of the cycle is operated by opening and closing the counterparts to the valves discussed above.

In the alternate aspect of the FIG. 2 embodiment referred to above, adsorbers F1 and G1 on the one hand, and adsorbers F2 and G2 on the other hand, undergo the first depressurization step separately. In this embodiment, when adsorber G2 is depressurized before adsorber F2, valve 114 is opened first and the upper adsorber is depressurized until the pressure in adsorber G2 drops to the desired level. Then valve 114 is closed and valve 110 is opened and the lower adsorber is depressurized until the pressure in that unit drops to the desired value. Then valves 106 and 114 are opened and valve 110 remains open and the second depressurization step proceeds in the manner described above. Adsorbers F1 and G1 are serially desorbed in the same way by proper manipulation of corresponding valves 112, 108 and 104.

As explained above, PPU D serves the purpose of removing water vapor and carbon dioxide from the carbon monoxide-rich fraction prior to the fractional distillation step. Water vapor and carbon dioxide and some higher hydrocarbons must be removed from the gas before cryogenic distillation; otherwise they will freeze in the distillation unit. When the gas exiting cooler B contains very little moisture, carbon dioxide or higher hydrocarbons, it can be easily handled in a typical prepurification unit, which is designed to remove impurity levels of these components. Unit D usually contains one or more regenerable adsorbents, such as activated alumina, activated carbon, silica gel or zeolites, which effectively remove the above impurities. A preferred adsorbent mixture comprises alumina and zeolite molecular sieves, either mixed or in layers. Unit D can be regenerated by passing a hot gas therethrough, by subjecting the adsorbent contained therein to a vacuum, by purging the adsorbent in the unit with a purge gas or by a combination of these techniques. The particular adsorbents used and the method of regeneration of unit D are well known and are not critical to the invention.

Because the effluent from unit C contains considerable amounts of methane, the cryogenic fractional distillation system employed is typically a two-stage distillation system wherein a hydrogen-enriched stream is removed as an overhead product from the first stage, high purity carbon monoxide is removed as overhead from the second stage and a liquefied methane fraction is removed from the bottom of the second stage. The carbon monoxide fraction entering unit E may contain small amounts of $C_2$ hydrocarbons in addition to methane, but since they behave like methane in the distillation step, they present no problems in the separation processes of the invention. As explained above, a portion of the liquefied methane fraction removed from the bottom of the second stage can be recirculated as reflux to the top of the first stage of unit E to scrub entrained carbon monoxide from the hydrogen-enriched product stream. The percentage of methane fraction recycled to unit A depends upon the desired composition of the products. The rate of recycle of the methane fraction from the fractional distillation system to the partial oxidation reactor can be varied to change the ratio of hydrogen to carbon monoxide in the synthesis gas. The specific details of useful two-stage fractionation systems are well known and the particular system used is not critical to the invention.

Figure 3:
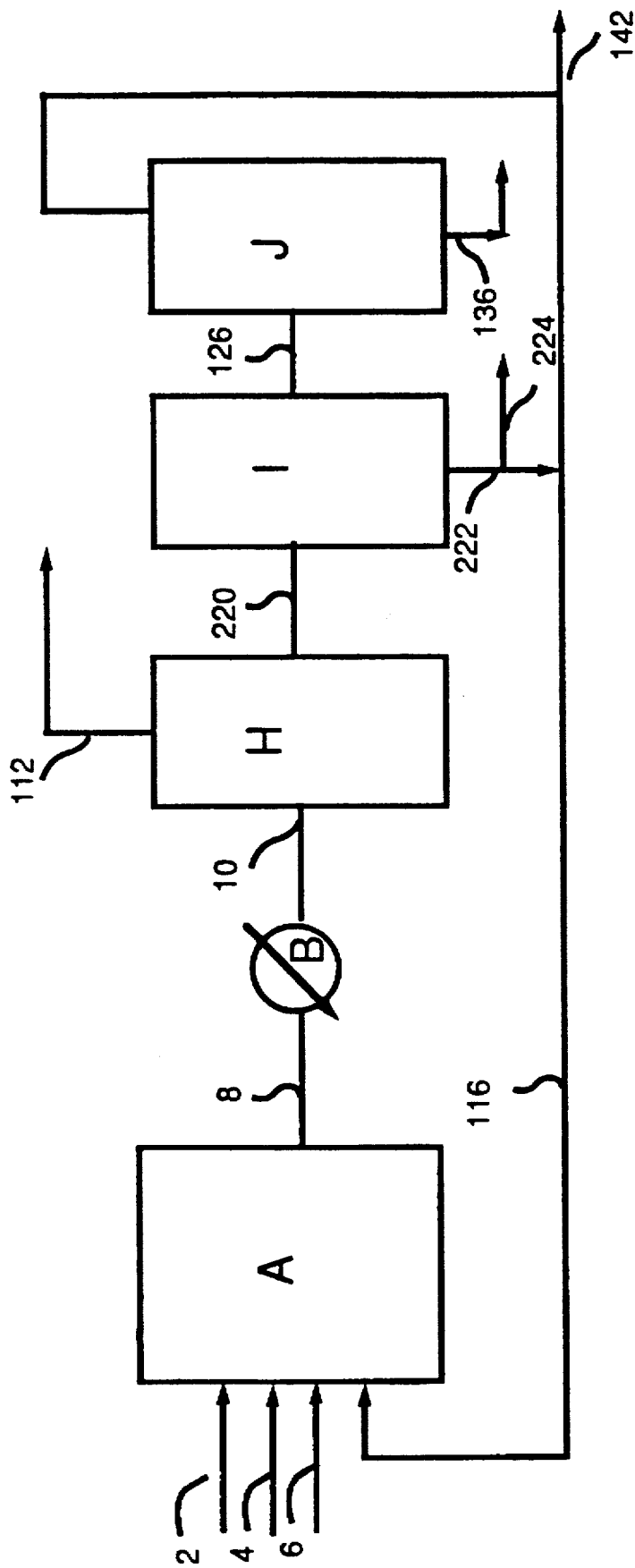
FIG. 3 is a schematic representation of an alternate embodiment of a system for separating the components of a synthesis gas.

In the system illustrated in FIG. 3, all units except unit J can be the same as the corresponding units of FIG. 1. PSA system H, however, is operated with a single depressurization step and the higher hydrocarbon, water vapor and carbon dioxide components leave this unit through line 220 as part of the carbon monoxide-rich fraction. PSA system J may comprise a single bed adsorption unit or a battery of parallel-arranged single bed units. The adsorption bed(s) of system J contain an adsorbent which adsorbs carbon monoxide more strongly than the other components of the gas stream. Suitable adsorbents include copper exchanged substrates, such as copper exchanged aluminosilicate zeolite molecular sieve, copper exchanged alumina and copper exchanged activated carbon and mixtures of these. Specific details of these copper-exchanged adsorbents and their use in the adsorption of carbon monoxide are provided in U.S. Pat. No. 5,096,470, the disclosure of which is incorporated herein by reference.

In the operation of the FIG. 3 system, cooled synthesis gas containing hydrogen, carbon monoxide, carbon dioxide, methane, water vapor and possibly higher hydrocarbons, leaves cooler B through line 10 and enters PSA system H. High purity hydrogen leaves unit H through line 112 and the carbon monoxide-rich fraction leaves this unit through line 220. The carbon monoxide-rich fraction passes through PPU unit I, wherein the water vapor, carbon dioxide and any higher hydrocarbons present in this stream are removed via line 222 and recycled to reactor A or discharged through line 224 and otherwise disposed of. The pre-purified carbon monoxide-rich stream then passes through PSA system J, wherein carbon monoxide is adsorbed. Methane and any hydrogen present in this stream pass through system J as non-adsorbed gases, and these components are recycled to reactor A or discharged from the system through line 142 and otherwise disposed of. Upon completion of the adsorption step in system J the adsorbent is regenerated, whereupon high purity carbon monoxide is desorbed and removed from the system through line 136.

In any of the adsorption processes of the invention the purity of the non-adsorbed product stream can be increased by including a non-adsorbed product backfill step. The PSA cycle may also include a step in which the adsorption zones are purged with non-adsorbed product gas during the final depressurization of these zones. Furthermore, when the adsorption system comprises two or more adsorption zones arranged in parallel relationship, the cycle can include a pressurize equalization step prior to the first depressurization step wherein immediately following the adsorption step in a given zone some of the gas in that zone is transferred to another zone as a first partial pressurization step. In the operation of PSA system J, a co-current purge step employing high purity carbon monoxide product may precede the high purity carbon monoxide production step.

The novel combination of high carbon monoxide selective, low hydrocarbon conversion partial oxidation reactor operating conditions and the separation methods according to the present invention provide significant savings in capital and operating expenses over conventional methods for preparing and separating synthesis gas. The separation when integrated into the partial oxidation reaction further enhance the oxidation process.

The invention is further illustrated in the following computer simulated examples wherein, unless otherwise specified, parts percentages and ratios are on a volume basis.

EXAMPLE 1

In a simulated run a synthesis gas is produced by reacting pentane, oxygen and steam in a partial oxidation reactor under the conventional conditions specified in the Table and the various products are recovered by a conventional system comprising in sequence: a carbon dioxide absorption system, a conventional prepurification unit which is presumed to remove all of the carbon dioxide and water vapor in the gas stream entering this unit, a cryogenic distillation unit operated under conditions that will produce the volume of carbon monoxide specified in the Table and a PSA system which contains as adsorbent zeolite 5A or 13X. The synthesis gas leaving the partial oxidation reactor is cooled to a temperature of about 35° C., whereupon some of the moisture in the gas condenses and is removed from the system. The cooled gas is presumed to be saturated with moisture at this temperature. The volume of the cooled gas is 949.3 Kmols/Hr and it contains, on a dry basis, 54.58% hydrogen, 41.45% carbon dioxide, 3.90% carbon dioxide and 0.07% methane. Carbon dioxide is removed from the synthesis gas in the carbon dioxide absorber at the rate of 37.0 Kmol/Hr. A sufficient quantity of the synthesis gas leaving the carbon dioxide absorber is fed to the prepurification unit to produce hydrogen and carbon monoxide in the quantities stated in the Table. The remainder is removed from the system as synthesis gas. The purifies of the hydrogen and carbon monoxide products removed from the system are 99.9% and 99%, respectively. The sorbate from the PSA unit is recycled to the feed to this unit. The reactant flow rates, reactant to carbon ratios, temperatures and absolute pressures (in bars), and the reaction conditions necessary to produce the specified quantities of hydrogen and carbon monoxide are listed in the Table.

EXAMPLE 2

The simulated procedure of Example 1 is repeated at the reactant flow rates and ratios, temperatures and pressures specified in the Table, except that the system is modified by the elimination of the carbon dioxide absorber and the methane separated from the carbon monoxide in the cryogenic fractional distillation unit is recycled to the partial oxidation reactor. The volume of synthesis gas exiting the cooler is 1178.8 Kmol/Hr. and it contains, on a dry basis, 43.55% hydrogen, 33.67% carbon monoxide, 22.06% methane and 0.72% carbon dioxide. Since the carbon dioxide content of the product gas is very low there is no need for a carbon dioxide absorber, and the cooled synthesis gas can be introduced directly into the PPU. The conditions necessary to produce the specified quantities of hydrogen and carbon monoxide are listed in the Table.

EXAMPLE 3

The simulated procedure of Example 1 is repeated at the reactant flow rates and ratios, temperatures and pressures specified in the Table, except that the gas separation system comprises in order: a PSA system, a PPU and a fractional distillation system. The PSA system comprises 4 pairs of serially-connected adsorbers arranged in parallel and operated out of phase with each other, and the PSA cycle includes a first depressurization step in which carbon monoxide is removed from the system at a point intermediate the first and second adsorbers of each pair The PSA system is operated in such a manner that the methane contained in the gas stream is adsorbed in the PSA unit with the higher hydrocarbons, carbon dioxide and water vapor. The sorbate from the PSA system is recycled to the partial oxidation reactor. The volume of synthesis gas exiting the cooler is 1171.5 Kmol/Hr. and it contains, on a dry basis, 44.25% hydrogen, 33.29% carbon monoxide, 21.74% methane and 0.72% carbon dioxide. The conditions necessary to produce the specified quantities of hydrogen and carbon monoxide are listed in the Table.

TABLE 1

|  | Example 1 | Example 2 | Example 3 |
|---|---|---|---|
| Products | | | |
| $H_2$ (Kmol/Hr) | 41.4 | 41.4 | 41.4 |
| CO (Kmol/Hr) | 184.6 | 184.6 | 184.6 |
| Syngas (Kmol/Hr) | 685.4 | 685.4 | 685.4 |
| $H_2$:CO ratio (in syngas) | 2.28 | 2.35 | 2.14 |
| Pentane Feed | | | |
| Flowrate, Kmol/Hr | 86.1 | 82.0 | 83.0 |
| Temp., °C. | 400 | 600 | 600 |
| Press., bar | 36 | 36 | 36 |
| Oxygen Feed | | | |
| Flowrate, Kmol/Hr | 232.5 | 179.1 | 179.3 |
| Temp., °C. | 1000 | 1000 | 1000 |
| Press., bar | 35 | 35 | 35 |
| Steam Feed | | | |
| Flowrate, Kmol/Hr | 86.1 | 65.7 | 60.4 |
| Temp., °C. | 1000 | 1000 | 1000 |
| Press., bar | 35 | 35 | 35 |
| POX Reactor | | | |
| Temp., 0° C. | 1350 | 1000 | 1000 |
| Press., bar | 33 | 33 | 33 |

The process of Example 1 combines a conventional partial oxidation process with a conventional gas product separation process. The process of Example 2 combines the novel partial oxidation process of the invention with a conventional gas product separation process. The process of Example 3 combines the novel partial oxidation process of the invention with the novel gas separation process of the invention.

A comparison of the results projected in the Table for Examples 1 and 2 shows that the process of Example 2 provides a feed savings of 4.8%, an oxygen savings of 22.9% and a steam savings of 23.7%, relative to the process of Example 1. These savings are realized largely because of the modified partial oxidation process of Example 2. Only 0.71% carbon dioxide is produced by the process of Example 2, while 3.90% carbon dioxide is produced by the process of Example 1, and 22.03% methane is produced by the process of Example 2, while only 0.07% methane is produced by the process of Example 1.

A comparison of the results projected in the Table for Examples 1 and 3 shows that the process of Example 3 provides a feed savings of 3.6%, an oxygen savings of 22.9% and a steam savings of 29.8%, relative to the process of Example 1. These savings are realized largely because only 0.72% carbon dioxide and 21.74% methane are produced by the process of Example 3, and the PSA system permits substantially all of the methane produced in the process to be recycled to the partial oxidation reactor.

The process of Example 3 also provides a significant energy savings compared to the processes of Examples 1 and 2 because hydrogen is separated from the synthesis gas before it enters the cryogenic fractional distillation unit. Since hydrogen comprises 44.25% of the synthesis gas stream (on a dry basis) a much smaller distillation unit can be used for the process of Example 3 than is required for the processes of Examples 1 and 2.

Although the invention has been described with particular reference to specific process steps, it is understood that the invention is not limited thereto and may include additional or equivalent steps. For example, the PSA step may include a vacuum depressurization step. Furthermore, the prepurification step preceding the cryogenic fractional distillation step may be eliminated if the effluent from the initial PSA system contains no carbon dioxide, water vapor or higher hydrocarbons that would freeze at the lowest temperature that the cryogenic distillation step is carried out. Also, as indicated in Example 3, the initial PSA system can be operated under conditions that will cause methane to be separated with the adsorbed gases, so that a single column distillation system can be used to separate high purity carbon monoxide from the synthesis gas product.

The scope of the invention is limited only by the breadth of the appended claims.

We claim:

1. A process for producing high purity hydrogen and high purity carbon monoxide comprising:

(a) contacting in a reaction zone a hydrocarbon feedstock comprising one or more gaseous or liquid hydrocarbons with an oxidant and one or both of carbon dioxide and steam as moderating agent at a temperature in the range of about 800° to about 1200° C., a pressure in the range of about 15 to about 1000 psig, a steam to carbon ratio and a carbon dioxide to carbon ratio each in the range of 0 to about 0.5, provided that at least one of these ratios is not 0, an oxygen to carbon ratio in the range of about 0.3 to about 0.6, and a maximum total sensible heat requirement of about 0.05 MMKJ/KC, so as to produce a gas mixture comprised of hydrogen, carbon monoxide, not more than about 2% by volume carbon dioxide and at least about 1% by volume methane;

(b) separating hydrogen product having a purity of at least about 98% and carbon monoxide product having a purity of at least about 98% from said gas mixture; and (c) recycling to said reaction zone at least part of the hydrogen-depleted and carbon monoxide-depleted gas mixture remaining after step (b).

2. The process of claim 1, wherein said hydrocarbon feedstock, oxidant and moderating agent are introduced into said reaction zone at a temperature in the range of about 600° to about 1000° C.

3. The process of claim 1, wherein the reaction temperature is in the range of about 900° to about 1100° C.

4. The process of claim 1, wherein the maximum total sensible heat requirement is 0.04 MMKJ/KC.

5. The process of claim 1, wherein the oxygen to carbon ratio is in the range of about 0.3 to 0.5 and the steam to carbon ratio and carbon dioxide to carbon ratio are each in the range of about 0 to about 0.4.

6. The process of claim 1, wherein said hydrogen product and said carbon monoxide product are separated from said gas mixture by a plurality of PSA steps.

7. The process of claim 1, wherein said hydrogen product and said carbon monoxide product are recovered from said gas mixture by a combination of PSA and cryogenic fractional distillation.

8. A process for producing high purity hydrogen and carbon monoxide comprising:

(a) contacting in a reaction zone a feedstock comprising one or more gaseous or liquid hydrocarbons with an oxidant and one or both of carbon dioxide and steam as moderating agent at a temperature in the range of about 800° to about 1200° C., a pressure in the range of about 15 to about 1000 psig, a steam to carbon ratio and a carbon dioxide to carbon ratio each in the range of 0 to about 0.5, provided that at least one of these ratios is not 0, an oxygen to carbon ratio in the range of about 0.3 to about 0.6, and a maximum total sensible heat requirement of about 0.05 MMKJ/KC, so as to produce a gas mixture comprised of hydrogen, carbon monoxide, unreacted hydrocarbons, water vapor, less than about 2% carbon dioxide, and at least about 1% methane;

(b) flowing said gas mixture through a PSA system comprising first and second serially-connected adsorption zones at superatmospheric pressure, each of said adsorption zones containing an adsorbent which adsorbs carbon monoxide less strongly than higher hydrocarbons, carbon dioxide and water vapor but more strongly than hydrogen, thereby adsorbing higher hydrocarbons, water vapor, carbon dioxide and carbon monoxide and producing hydrogen having a purity of at least about 98%;

(c) terminating the flow of gas mixture through said PSA system and partially depressurizing said first and second adsorption zones by withdrawing a carbon monoxide-rich fraction countercurrently from said second adsorption zone and cocurrently from said first adsorption zone;

(d) further depressurizing said first and second adsorption zones by countercurrently withdrawing a stream rich in hydrocarbons, water vapor and carbon dioxide therefrom;

(e) fractionally distilling said carbon monoxide-rich fraction, thereby yielding carbon monoxide having a purity of at least about 98%, a hydrogen and carbon monoxide fraction and a methane fraction; and (f) recycling at least one of said stream rich in higher hydrocarbons, water vapor and carbon dioxide and said methane fraction to said reaction zone.

9. The process of claim 8, comprising the additional step of passing said carbon monoxide-rich fraction through a prepurification unit prior to step (e), thereby removing residual carbon dioxide and water vapor therefrom.

10. The process of claim 8, wherein in step (c) carbon monoxide-rich fraction is first withdrawn from said second adsorption zone and then withdrawn from said first adsorption zone.

11. The process of claim 8, wherein the adsorbent in said first adsorption zone system comprises activated carbon.

12. The process of claim 11, wherein the adsorbent in said second adsorption zone comprises activated carbon, zeolite molecular sieves or mixtures of these.

13. The process of claim 8, wherein step (d) is accompanied by a hydrogen purge.

14. A process for producing high purity hydrogen and carbon monoxide comprising:

(a) contacting in a reaction zone a feedstock comprising one or more gaseous or liquid hydrocarbons with an oxidant and one or both of carbon dioxide and steam as moderating agent at a temperature in the range of about 800° to about 1200° C., a pressure in the range of about 15 to about 1000 psig, a steam to carbon ratio and a carbon dioxide to carbon ratio each in the range of 0 to about 0.5, provided that at least one of these ratios is not 0, an oxygen to carbon ratio in the range of about 0.3 to about 0.6, and a maximum total sensible heat requirement of about 0.05 MMKJ/KC, so as to produce a gas mixture comprised of hydrogen, carbon monoxide, unreacted hydrocarbons, water vapor, less than about 2% carbon dioxide, and at least about 1% methane;

(b) flowing said gas mixture at superatmospheric pressure through a first PSA system comprising at least one adsorption zone containing an adsorbent which adsorbs hydrogen less strongly than hydrocarbons, carbon dioxide, water vapor and carbon monoxide, thereby producing hydrogen having a purity of at least about 98%;

(c) terminating the flow of said gas mixture through said first PSA system and depressurizing said adsorption zone, thereby producing a carbon monoxide-rich fraction;

(d) passing said carbon monoxide-rich fraction into a second PSA system comprising at least one adsorption zone containing an adsorbent which adsorbs carbon monoxide more strongly than hydrogen, methane, water vapor and carbon dioxide, thereby producing a carbon monoxide-lean fraction;

(e) terminating the flow of carbon monoxide-rich fraction through said second PSA system and desorbing said at least one adsorption zone in said second PSA system, thereby producing carbon monoxide having a purity of at least about 98%; and (f) recycling at least part of said carbon monoxide-lean fraction to said reaction zone.

15. The process of claim 14 comprising the additional step of passing said carbon monoxide-rich fraction through a prepurification unit prior to step (d), thereby removing higher hydrocarbons, carbon dioxide and water vapor therefrom.

16. The process of claim 8 or claim 14, wherein said hydrocarbon feedstock, oxidant and moderating agent are introduced into said reaction zone at a temperature in the range of about 600° to about 1000° C.

17. The process of claim 8 or claim 14, wherein the reaction temperature is in the range of about 900° to about 1100° C.

18. The process of claim 8 or claim 14, wherein the maximum total sensible heat requirement is 0.04 MMKJ/KC.

19. The process of claim 8 or claim 14, wherein the oxygen to carbon ratio is in the range of about 0.3 to 0.5 and the steam to carbon ratio and carbon dioxide to carbon ratio are each in the range of about 0 to about 0.4.

20. The process of claim 14, wherein the adsorbent in said at least one adsorption zone in said first PSA system comprises activated carbon.

21. The process of claim 14 wherein the adsorbent in said at least adsorption zone in said second PSA system comprises a copper-containing substrate.

22. The process of claim 21, wherein said copper-containing substrate is copper-exchanged zeolite molecular sieves, copper-exchanged alumina, copper-impregnated activated carbon or mixtures of these.

* * * * *